United States Patent [19]

Wristers

[11] 4,085,064

[45] Apr. 18, 1978

[54] PURPLE TiCl₃ BY DIRECT LOW TEMPERATURE REDUCTION

[75] Inventor: Harry J. Wristers, Baytown, Tex.

[73] Assignee: Exxon Research & Engineering Co., Linden, N.J.

[21] Appl. No.: 640,094

[22] Filed: Dec. 12, 1975

[51] Int. Cl.² .............................................. B01J 31/02
[52] U.S. Cl. ................................ 252/429 B; 526/139; 526/141; 526/142
[58] Field of Search .................... 252/429 B, 429 A

[56] References Cited

U.S. PATENT DOCUMENTS

| | | | |
|---|---|---|---|
| 3,032,511 | 5/1962 | Langer | 252/429 C |
| 3,055,878 | 9/1962 | Janoski | 252/429 B X |
| 3,117,834 | 1/1964 | Siggel et al. | 252/429 B X |
| 3,141,872 | 7/1964 | Natta et al. | 252/429 A X |
| 3,238,145 | 3/1966 | Loeb | 252/429 A |
| 3,277,069 | 10/1966 | Natta et al. | 252/429 B X |
| 3,325,461 | 6/1967 | Boor | 252/429 B X |
| 3,560,146 | 2/1971 | Luciani et al. | 252/429 B X |
| 3,594,330 | 7/1971 | Delbouille et al. | 252/429 A |
| 3,681,256 | 8/1972 | Blunt | 252/429 A |
| 3,769,233 | 10/1973 | Hermans et al. | 252/429 B X |
| 3,793,295 | 2/1974 | Luciani et al. | 252/429 B X |

FOREIGN PATENT DOCUMENTS

| | | | |
|---|---|---|---|
| 2,213,086 | 10/1972 | Germany | 252/429 |
| 1,391,067 | 4/1975 | United Kingdom. | |

*Primary Examiner*—Patrick P. Garvin
*Assistant Examiner*—William G. Wright
*Attorney, Agent, or Firm*—David A. Roth; Ben C. Cadenhead

[57] ABSTRACT

Reduction of TiCl₄ with an excess of $Et_nAlCl_{3-n}$ where $n = 1$ to 1.95 preferably $AlEtCl_2$ at $-20°$ to $+30°$ C results in a purple catalyst.

8 Claims, No Drawings

PURPLE TiCl₃ BY DIRECT LOW TEMPERATURE REDUCTION

CROSS REFERENCE TO RELATED APPLICATIONS

There are no related applications by the same inventor or other employees of his assignee.

BACKGROUND OF THE INVENTION

1. Field of Invention

This invention relates to the preparation of a Ziegler-type catalyst having a purple color. The catalyst of the present invention is particularly useful in the polymerization of α-olefins to produce polyolefin powders.

2. Description of Prior Art

It is known that $TiCl_4$ can be reduced with alkyl aluminum halides. Thus the reduction of $TiCl_4$ by $Et_2AlCl$ or $EtAlCl_2$ has been described by this author in U.S. Pat. No. 3,905,915. Reduction of mixtures of aluminum alkyl halides is also known and has been described in various patents, of which the following serve as examples: In U.S. Pat. No. 3,397,195 assigned to Hercules, 1 mole of $TiCl_4$ is reduced with a mixture comprising 0.8 moles $EtAlCl_2$ and 0.8 moles $Et_2AlCl$; in U.S. Pat. No. 3,388,076 assigned to Hercules, one mole of $TiCl_4$ is reduced with a mixture comprising 1.2 moles of $EtAlCl_2$ and 1.2 moles of $Et_2AlCl$; in U.S. Pat. No. 2,909,511 assigned to Hercules, one mole of $TiCl_4$ is reduced with a mixture comprising 0.86 moles of $EtAlCl_2$ and 0.6 moles of $Et_2AlCl$.

It is known in the art that the reduction product of $TiCl_4$ and $Et_nAlCl_{3-n}$, where n can have values from 2-3, is the kinetically favored beta-form which has a brown color. This beta-$TiCl_3$ can be converted to the thermodynamically favored purple form which can have either the alpha, gamma or delta structure. This crystal conversion, which is necessary to obtain a stereospecific polymerization catalyst, can be effected by heating the catalyst at temperatures near 150° C as has been described in Br. Pat. No. 1,139,450, assigned to Shell, or by treating the brown $TiCl_3$ form with excess $TiCl_4$ as has been described in U.S. Pat. No. 3,769,233, assigned to Solvay.

It has recently been described in the art that $TiCl_3$ compounds containing $Et_nAlCl_{3-n}$, where n can have values from 0.1 to 2, can be activated by sequential Lewis base-$TiCl_4$ treatments. Thus Solvay (DT Pat. No. 2,213,086, South African application No. 72-01,245) published that $TiCl_3$ catalysts formed by the reduction of $TiCl_4$ with alkyl aluminum compounds at moderate temperatures can be substantially improved by subsequent treatments with certain Lewis bases and $TiCl_4$. The subsequent treatment appears to effect substantial improvements in efficiency and stereospecificity as compared to catalyst not so treated.

SUMMARY OF THE INVENTION

Reduction of $TiCl_4$ with a molar excess of $Et_n$-$AlCl_{3-n}$ where $n = 1$ to 1.95 preferably ethyl aluminum dichloride ($EtAlCl_2$) at moderate temperatures results directly in a purple $TiCl_3$, which is more responsive to a Lewis base/$TiCl_4$ treatment than non-purple $TiCl_3$.

DESCRIPTION OF THE PREFERRED EMBODIMENTS

It has been found that when $TiCl_4$ is reduced with $Et_nAlCl_{3-n}$, where n can have values from 1 to 1.95, the $TiCl_3$ product is in the purple form. Consequently the subsequent activation with a Lewis base and $TiCl_4$ can be effected with less $TiCl_4$. This improvement over the art means savings in raw materials, can improve safety of operations, and reduce the criticality of reaction conditions. Furthermore, catalyst prepared by this improvement has improved properties.

The production of catalysts according to this invention can best be described in three steps. In the first step, $TiCl_4$ is reduced with either pure $EtAlCl_2$ or a mixture of $EtAlCl_2$ and $Et_2AlCl$ in inert diluent. The reduction is normally performed in inert hydrocarbon solvents, which can be any of those commonly employed in the polymerization of olefins, and preferably comprises one or more of aliphatic or cycloaliphatic hydrocarbons containing from 5-12 carbon atoms. The diluent most conveniently used is heptane.

The molar ratio of $Et_nAlCl_{3-n}$ reducing agent to $TiCl_4$ should be such that n:$TiCl_4$ is always equal to or greater than one. Preferably n:$TiCl_4$ ratio should be from 1.0 to 4.5, and most preferably the ratio should be from 1.5 to 2.5. Thus it is obvious to those knowledgable in the art that by way of example one mole of $TiCl_4$ can be reduced with 2.5 moles of $EtAlCl_2$ or a mixture of 1 mole of $Et_2AlCl$ and 0.5 moles of $EtAlCl_2$. It is understood that $TiCl_4$ can be reduced, according to this invention, by mixtures of alkyl aluminum halides normally employed having the formula $RnAlX_{3-n}$, where X is chlorine, bromine, or iodine, and n is a value from 1 to 1.95 and R is a hydrocarbon radical containing from 1-8 carbon atoms, preferably from 2-4 carbon atoms, most preferably 2 carbon atoms.

The temperature of reduction can be any value from −30° to +30° C, preferably from −10° to +10° C, most preferably 0° C.

The concentration can be any value such that the combined molarity of $TiCl_4$ and $RnAlCl_{3-n}$ is from 1 to 3.5 molar, preferably from 1.5 to 3.0 molar, most preferably 2.5 molar.

While it is not essential that the reaction mixture is stirred, it is preferable to mix the reagents during reduction at such a rate that teh resultant catalyst particles are in the shape of spherical particles having an average diameter from 10 to 60 microns. The mixing should be such that the mixing energy should be from 100 to 300 watts/liter. Specifications for vessel size, impeller shape and size, and revolution rate to achieve the above power input has been described by this inventor in U.S. Pat. No. 3,905,915, Column 5.

The product of the first step has a purple color, and the X-ray powder diffraction patterns (Cu K α) indicate that the catalyst is in the alpha, gamma or delta form rather than the brown beta form, i.e. spectral peaks at 15 to 15.08 and 30.4 and 35.6°2θ instead of 16.40 and 32.52°2θ respectively. These assignments have been made as described by G. Natta in J. Polym. Sci., 51, 399 (1961).

In the second step, the purple $TiCl_3$ catalyst is treated with a Lewis base at a mole ratio of Lewis base: $TiCl_3$ from 0.5 to 2.0, preferably from 0.75 to 1.5, most preferably 1.0. The Lewis base employed is defined as a compound containing an atom from Groups IVA and VA, i.e., one containing one or more pairs of unshared electrons. Thus, ethers, amines, phosphines serve as examples. The Lewis bases that can be employed have been described in Solvay's DT Pat. No. 2,213,086. The treatment is preferably done in the inert diluents that were used in the reduction step, as described above. The concentration of catalyst and Lewis base in the diluent can vary from 3 to 50 and 5–50 volume percent respectively. The temperature used in the Lewis base treatment can vary between 25° to 100° C, preferably between 35° to 65° C. The time of treatment can vary between 15 to 240 minutes, preferably between 60 to 120 minutes.

Subsequent to the Lewis base treatment, the catalyst may be separated, and washed or may be treated directly with $TiCl_4$. In any event, while Solvay teaches that the $TiCl_4$ concentration must be above 15 volume percent, preferably 40 volume percent (DT Pat. No. 2,213,086), we have found that lower concentrations work well when the catalyst has been formed in the first step under those conditions that a purple product forms. Thus in Step 3, the Lewis base-treated catalyst is treated with $TiCl_4$ in an inert diluent for a specific length of time at a certain temperature.

The $TiCl_4$ concentration can vary from 1 to 100 volume percent, preferably from 5 to 15, most preferably 10 volume percent. The inert diluents that can be used in this step are those described in Step 1, and in this step can also include aromatic hydrocarbons such as alkylated benzenes, $C_6H_nR_{6-n}$, where n can have a value from 1–6, and R is a hydrocarbon radical containing from 1 to 4 carbon atoms. The catalyst is treated with $TiCl_4$ for a time period varying from 30 to 1440 minutes, preferably from 60 to 180 minutes, most preferably for 120 minutes. The $TiCl_4$ treatment can be effected at temperatures from 25° to 90° C, preferably from 50° t 75° C, most preferably at 65° C.

Subsequent to the $TiCl_4$ treatment, the catalyst product is washed and dried. The catalyst can be used for the polymerization or copolymerization of olefin such as $C_nH_{2n}$ where n can have a value from 2 to 6, preferably from 2 to 3, most preferably 3, i.e. propylene. The catalyst can also be used for the polymerization and/or copolymerization of dienes with olefins as described above.

It is understood that Steps 1 and 2 described above can be performed sequentially or concurrently as described in patent application U.S. Ser. No. 622,956, filed 10-16-75.

EXAMPLES

In order to illustrate the present invention, the following examples are given. In each case, the formation of catalyst was carried out by reduction and crystallization in the following equipment, and following generally the procedure set forth. A 500 ml round-bottom flask, without baffles, equipped with a flat-bladed mechanical stirrer, a thermometer and an addition port is cooled to −30° C in a dry ice/isooctane bath. The stirrer had two blades mounted at 180°, with an overall diameter of 6 centimeters. The entire assembly and all catalyst preparations are maintained in an inert atmosphere. To the cooled flask, diethylaluminum chloride (1.0 to 3.5 molar in n-heptane) is added. The diethylaluminum chloride solution is stirred at a rate between 210 and 400 rpm. The stirring rate is maintained as closely as possible to a specific value during the preparation, i.e. 250 ± 10 rpm. To the alkylaluminum chloride solution, $TiCl_4$ (1.5 to 3.0 molar n-heptane) is added at a rate of three mmoles/minutes. When all the $TiCl_4$ solution has been added (0.22–1.9 moles of $TiCl_4$ mole of alkyl aluminum chloride), the mixture is warmed to +40° to +65° C at a rate of 0.5° C per minute. The stirred reaction mixture is maintained at this temperature for 1 hour.

After the +40° to 65° C aging, the catalyst may be filtered, washed twice with heptane and the catalyst is resuspended in heptane in the same vessel using the same mixing system (20 gms of catalyst per 80 cc of n-heptane). With mild stirring (100 rpm), the Lewis base is added dropwise. The mixture is warmed to 35° to 50° C, and held at this temperature for 60 minutes. The solid catalyst is filtered, washed twice with heptane (volume of washing solvent used is ten times amount of catalyst), and resuspended in heptane solvent.

In the final step, the catalyst in the heptane solvent is slowly stirred while 100% $TiCl_4$ is added dropwise at room temperature. The slurry is warmed to 65° C and held at 65° C for 120 minutes. The final catalyst product is filtered, and washed five times with heptane and is dried at reduced pressure.

EXAMPLE 1

A solution of 2.274 mmoles per milliliter of titanium tetrachloride in n-heptane was prepared, as was a solution of 1.59 mmoles per milliliter of ethylaluminum dichloride in n-heptane. An admixture of 75 cc of the $TiCl_4$ solution (170.55 mmoles) and 100 cc of the ethylaluminum dichloride solution (255 mmoles) was prepared at −30° C. This gave a molar ratio of $TiCl_4$ to ethylaluminum dichloride of about 0.67.

The admixture was formed by the addition of the $TiCl_4$ solution to the diethylaluminum chloride solution at the rate of 1.0 cc per minute.

Throughout the addition and through out the remainder of the reaction, the stirring rate was maintained at about 250 rpm. The temperature was raised at the rate of about 0.5° C per minute to a final temperature of about 40° C, at which point the heat input was terminated. The reaction mixture was held at this temperature, 40° C, for 1 hour. The catalyst was filtered, washed with n-heptane and resuspended in heptane. The catalyst was examined and found to have a particle size distribution of about 45–60 microns. It had a narrow particle size distribution, spherical shape and was purple in color.

EXAMPLE 2

A solution of 1.82 mmoles per milliliter of $TiCl_4$ in isooctane was prepared, as was a solution of 2.23 mmoles per milliliter of diethylaluminum chloride in isooctane. An admixture of 90 cc of the $TiCl_4$ solution (163.8 mmoles) and 120 cc of the diethylaluminum chloride solution (267.6 mmoles) was prepared at −30° C. This gave a molar ratio of $TiCl_4$ to $Et_2AlCl$ of about 0.61.

The admixture formed by the addition of the $TiCl_4$ solution to the $Et_2AlCl$ solution at the rate of 1.1 cc per minute.

Throughout the addition and throughout the remainder of the reaction, the stirring rate was maintained at about 250 rpm. The temperature was raised at the rate of about 1° C per minute to a final temperature of +65° C. The reaction mixture was held at this temperature, +65° C, for 1 hour, after which the catalyst was filtered, washed twice with heptane, and dried.

The catalyst was examined and found to have a narrow particle size distribution and was brown in color.

EXAMPLES 3-8

In fashion similar to examples 1 and 2, $TiCl_4$ was reduced with mixtures of $EtAlCl_2$ and $Et_2AlCl$. The results are summarized in Table I attached. Catalyst prepared according to experiments 3 to 7 yielded purple catalysts, while the catalyst prepared at a molar ratio of $Et_nAlCl_{3-n}$ to $TiCl_4$ above 12, example 8, yields a brown catalyst. The catalyst prepared according to experiment 9 was brown. It was prepared by reduction of $TiCl_4$ with $Et_2AlCl$.

EXAMPLES 10-15

Catalysts prepared according to experiments 3-8 were treated with a Lewis base. Thus, 10 gms of purple catalyst resulting from the reduction of $TiCl_4$, was suspended in 32 cc of heptane and 8.45 cc (41 mmoles) of di-isopentylether was added dropwise to the catalyst slurry. With gentle agitation, the slurry was heated to 35° C and held at 35° C for 60 minutes. The catalyst was filtered and washed with two 50 cc fractions of heptane.

The washed ether-treated catalyst was resuspended in 16 cc heptane, and 10.7 cc of $TiCl_4$ (97 mmoles) was added dropwise to the catalyst slurry. The catalyst slurry was heated to 65° C, and the reaction mixture was held at 65° C for 120 minutes. The purple catalyst product was filtered and washed with 50 cc heptane fractions five times. The catalyst was dried under reduced pressure.

Catalyst prepared according to the above general procedure exhibited the phenomenon that those catalysts which were purple after the reduction step (reduced by $EtAlCl_2$ plus $Et_2AlCl$) could be activated with lower concentrations of $TiCl_4$ (examples 10-12) than catalysts that were brown after the reduction step (examples 13-15) (reduced by $Et_2AlCl$).

The catalysts were evaluated for the polymerization of propylene by adding to a one liter autoclave 0.1 gm of catalyst, 0.18 gm $Et_2AlCl$ cocatalyst, 600 ml of hydrogen and 800 ml of liquid propylene. The propylene was polymerized by the catalyst for 30 minutes at 68° C. The unreacted monomer and hydrogen was allowed to flash and the polymer product was weighed. The catalyst efficiency was determined by dividing the weight of the polymer by the amount of catalyst that was used. A sample of polymer was extracted with heptane for 300 minutes, and the stereospecificity of the catalyst was reported as the weight percent of polymer that was insoluble after this extraction.

The results are summarized in Table II and show that purple catalysts can be activated with low volume concentrations of $TiCl_4$ to yield active catalysts (examples 10-12) as compared to activation of brown catalysts which at $TiCl_4$ volumes below 40%, do not exhibit excellent properties (examples 13-15).

By comparison, a $TiCl_3AA$ catalyst manufactured and sold by Stauffer, prepared by the reduction of $TiCl_4$ with aluminum, followed by ballmilling, exhibits a catalyst efficiency and percent heptane insolubles content of 430 and 93.1% respectively.

Table I

| | | | Catalyst Preparations | | | | | | | | |
|---|---|---|---|---|---|---|---|---|---|---|---|
| | | | $TiCl_4$ | | $EtAlCl_2$ | | $Et_2AlCl$ | | $Et_nAlCl_{(3-n)}$:$TiCl_4$ | | Catalyst |
| Ex. No. | Experiment No. | Date | Conc. (M) | Mmoles | Conc. (M) | Mmoles | Conc. (M) | Mmoles | Al:Ti | n:$TiCl_4$ | Color |
| 3 | 4122-12-1 | May, 1970 | 2.27 | 171 | 1.23 | 119 | 1.23 | 34 | 1.2 | 1.1 | Purple |
| 4 | 4375-26 | Aug., 1974 | 1.8 | 164 | 1.78 | 82 | 3.56 | 164 | 1.5 | 2.5 | Purple |
| 5 | 4122-13-1 | May, 1970 | 2.27 | 171 | 1.23 | 34 | 1.61 | 85 | 0.7 | 1.2 | Purple |
| 6 | 4121-79-1 | Feb., 1970 | 2.27 | 170 | 1.2 | 68 | 1.2 | 68 | 0.8 | 1.2 | Purple |
| 7 | 4374-52 | July, 1973 | 1.82 | 120 | 0.85 | 128 | 0.85 | 128 | 2.1 | 3.0 | Purple |
| 8 | 4374-53 | July, 1973 | 1.82 | 41 | 0.85 | 255 | 0.85 | 255 | 12.5 | 18.75 | Brown |
| 9 | 4375-18 | July, 1974 | 1.99 | 159 | — | — | 0.96 | 159 | 1.0 | 2.0 | Brown |

Table II

| | | Catalyst Preparations | | | Catalyst Properties | |
|---|---|---|---|---|---|---|
| Example No. | Reducing Agent Used in Step 1, mole $Et_nAlCl_{3-n}$/mole $TiCl_4$ | Catalyst Color After Step 1 | Ether Treatment mmoles ether/mmoles $TiCl_3$ | $TiCl_4$ Treatment vol. % | Cat. Efficiency w/w | Heptane Insolubles % |
| 10 | 1.5 $Et_{1.67}AlCl_{1.33}$ | Purple | 0.97 | 40 | 1960 | 97.0 |
| 11 | " | Purple | 0.97 | 15 | 1990 | 97.6 |
| 12 | " | Purple | 0.97 | 5 | 1360 | 95.4 |
| 13 | 1.0 $Et_2AlCl$ | Brown | 0.97 | 40 | 1410 | 98.1 |
| 14 | " | Brown | 0.97 | 15 | 1160 | 95.5 |
| 15 | " | Brown | 0.97 | 5 | 950 | 97.4 |

What is claimed is:

1. In the process of preparing an olefin polymerization catalyst which comprises reducing $TiCl_4$ with $AlR_nX_{3-n}$ where R is $C_1$ to $C_{18}$, n is 0 to 3, and X is F, Cl, Br or I and subjecting the resulting $TiCl_3$ catalyst to a Lewis base/$TiCl_4$ treatment to convert it to a purple crystallographic form to improve the efficiency and stereospecificity thereof, the improvement which comprises:

utilizing $AlR_nX_{3-n}$, where $n = 1$ to 1.95 and R is ethyl, in said reduction of $TiCl_4$, in greater than stoichiometric amounts where the molar ratio of $AlR_nX_{3-n}$ to $TiCl_4$ is such that the ratio of n:$TiCl_4$ is between 1.0-4.5 at a temperature of from −30 ° C to about 30° C to produce a purple $TiCl_3$ catalyst prior to treatment with Lewis base/$TiCl_4$, and utilizing in said Lewis base/$TiCl_4$ treatment, $TiCl_4$ in a concentration of about 5 to about 15 volume percent.

2. The process of claim 1 wherein said reducing agent is $AlEtCl_2$.

3. The process of claim 1 where the molar ratio of $AlR_nX_{3-n}$ to $TiCl_4$ is such that the ratio of n:$TiCl_4$ is from 1.5 to 2.5.

4. The method of claim 1 wherein said Lewis base/$TiCl_4$ treatment is carried out by treating the purple $TiCl_3$ catalyst obtained by said reduction step with a Lewis base followed by treatment with a $TiCl_4$ solution.

5. A catalyst prepared according to claim 4, where the Lewis base is a material or mixture of materials containing one or more atoms of Groups VA and VIA.

6. A catalyst prepared according to claim 4, where the Lewis base is an ether.

7. A catalyst prepared according to claim 4, where the Lewis base is an ether, R—O—R', where R and R' are hydrocarbon radicals having 4-6 carbon atoms.

8. A catalyst prepared according to claim 4, where the Lewis base is di-isopentyl ether.

* * * * *